(12) United States Patent
Morash et al.

(10) Patent No.: US 12,509,406 B2
(45) Date of Patent: Dec. 30, 2025

(54) ORGANIC POTASSIUM COMPOSITIONS DERIVED FROM PLANT ASH

(71) Applicant: BIO-GRO, INC., Mabton, WA (US)

(72) Inventors: Daniel Morash, Sacramento, CA (US); Mark LeJeune, Woodland, CA (US); Steve Zicari, Davis, CA (US)

(73) Assignee: BIO-GRO, INC., Mabton, WA (US)

( * ) Notice: Subject to any disclaimer, the term of this patent is extended or adjusted under 35 U.S.C. 154(b) by 902 days.

(21) Appl. No.: 17/493,567

(22) Filed: Oct. 4, 2021

(65) Prior Publication Data
US 2022/0106237 A1 Apr. 7, 2022

Related U.S. Application Data

(60) Provisional application No. 63/087,417, filed on Oct. 5, 2020.

(51) Int. Cl.
*C05F 11/00* (2006.01)
*C05G 5/23* (2020.01)

(52) U.S. Cl.
CPC .............. *C05F 11/00* (2013.01); *C05G 5/23* (2020.02)

(58) Field of Classification Search
CPC .......... C05F 11/00; C05G 5/23; A01C 21/00; Y02W 30/40; C05D 1/00; C05D 9/00; C05D 3/00
See application file for complete search history.

(56) References Cited

U.S. PATENT DOCUMENTS

| 3,231,365 A | * | 1/1966 | Wahlberg | C05G 3/70 71/64.1 |
| 2004/0126460 A1 | * | 7/2004 | Schrauzer | A61K 31/593 426/72 |
| 2013/0133386 A1 | | 5/2013 | Baker et al. | |

FOREIGN PATENT DOCUMENTS

| CN | 101665372 A | * | 3/2010 |
| CN | 106538103 A | * | 3/2017 |
| JP | S62146582 A | * | 6/1987 |
| WO | 2019151892 A1 | | 8/2019 |

OTHER PUBLICATIONS

CSS. "K-Plex Organic 0-0-8". Safety Data Sheet. Date of issue: Oct. 3, 2019 (Year: 2019).*
WSDA Organic Program—Organic Input Material List. p. 27 Jul. 11, 2024 (Year: 2024).*
Baidu Encyclopedia. "plant ash" Residues from burning plants (herbaceous and woody). <https://baike.baidu.com/> Dec. 13, 2017 (Year: 2017).*
Nachurs, "Nutrient Uptake and Transport Throughout the Plant" Website Editor <https://www.nachurs.com/nutrient-uptake-and-transport-throughout-the-plant> Nov. 27, 2017 (Year: 2017).*

(Continued)

*Primary Examiner* — Jennifer A Smith
(74) *Attorney, Agent, or Firm* — DUANE MORRIS LLP

(57) ABSTRACT

Compositions comprising Certified Organic potassium salts derived from plant ash are described herein. The compositions described herein include potassium acetate derived from acetic acid and sunflower ash. Such compositions can be used as a fertilizer component in organic farming and result in higher plant yields compared to plants treated with inorganic forms of potassium alone.

12 Claims, 6 Drawing Sheets

(56) References Cited

OTHER PUBLICATIONS

International Search Report and Written Opinion issued Jan. 14, 2022 for PCT/US2021/053342, 11 pages.
Latham, "Wood ash: add vinegar!", houzz, 2015, pp. 1-4, <https://www.houzz.com/discussions/3146705/wood-ash-add-vinegar>.
Jeff, "Is wood ash good for fruit trees?", Big Yard Fun, Feb. 21, 2020, pp. 1-7, <https://bigyardfun.com/is-wood-ash-good-for-fruit-treesl>.
"Mixing acid with wood ashes for fertilizer . . . ", houzz, 2012, pp. 1-7 <https://www.houzz.com/discussions/1702868/mixing-acid-with-wood-ashes-for-fertilizer>.
Paleckienė, et al., "Complex Fertilizers Produced from the Sunflower Husk Ash" ish Journal of Environmental Studies Jan. 2010, 19(5): 973-979.
State of California Department of Food and Agriculture, Organic Input Material Label Registration Application, K-Plex Organic 0-0-8 Jan. 14, 2020, 34 pages.
Midwest Laboratories, Report of Analysis, Wood Ash, Jan. 6, 2025, 4 pages.
R. Siddique "Wood Ash" Chapter 9, Waste Materials and By-Products in Concrete, 2008, Springer Science and Business Media, pp. 303-304.
Yelatontsev, Dmytro, and Anatoliy Mukhachev. "Utilizing of sunflower ash in the wet conversion of phosphogypsum—a comparative study." Environmental Challenges 5 (2021): 100241, 6 pages.
Gupta, Nidhi, Shailendra Singh Gaurav, and Ashwani Kumar. "Molecular basis of aluminium toxicity in plants: a review." American Journal of Plant Sciences (2013) 4, 21-37.

* cited by examiner

ORGANIC POTASSIUM COMPOSITIONS DERIVED FROM PLANT ASH

RELATED APPLICATIONS

This application claims priority to U.S. Provisional Application Ser. No. 63/087,417, filed Oct. 5, 2020, the contents of which are herein incorporated in its entirety.

FIELD OF THE INVENTION

This invention relates to compositions comprising organic potassium salts wherein the potassium source is derived from plant ash. Such organic potassium salts can be used in whole or in part of a fertilizer composition.

BACKGROUND

The following includes information that may be useful in understanding the present invention. It is not an admission that any of the information, publications or documents specifically or implicitly referenced herein are prior art, or essential, to the presently described or claimed inventions. All publications and patents mentioned herein are hereby incorporated by reference in their entirety.

Potassium (K) is a critical component of fruit-bearing crop fertilizers. Plants take up large quantities of potassium during their life cycle, including during fruit production. Potassium is involved with enzyme activation within the plant, which affects protein, sugar and starch translocation and adenosine triphosphate (ATP) production. The production of ATP can regulate the rate of photosynthesis, and plants with increased levels of ATP can grow and produce more fruit. Potassium also regulates the opening and closing of the stomata, which regulates the exchange of water vapor, oxygen and carbon dioxide. If K is deficient or not supplied in adequate amounts, it stunts plant growth and reduces yield.

Potassium (K) is one of the three most common mineral sources in fertilizer ("NPK"), the others being nitrogen (N) and phosphorous (P). Often the potassium component levels in a fertilizer are listed in $K_2O$ equivalents ("$K_2O$ eq."), adjusting for the molecular weight. However, potassium is rarely present in fertilizers as potassium oxide because potassium oxide is hygroscopic and quickly forms potassium hydroxide in the presence of water. Common forms of potassium include potassium chloride (KCl) ("muriate of potash"), potassium sulfate ($K_2SO_4$) ("sulfate of potash"), potassium thiosulfate, and potassium nitrate. Unfortunately, some plants are chloride sensitive and thus KCl is an inappropriate form of potassium for such plants. In addition, the most common sources of potassium chloride are either directly from mines or reacting potash (potassium chloride/hydroxide) with muriatic acid (HCl) followed by evaporation of water. Potassium sulfate is problematic for foliar application. Also, the production of potassium sulfate involves significant levels of greenhouse gasses, as the most common synthesis route of potassium sulfate is to heat potash (potassium chloride/hydroxide) at temperatures over 600 degrees Celsius in the presence of sulfuric acid. Potassium thiosulfate is problematic for foliar application at high temperatures (over 95 degrees Fahrenheit/35 degrees Celsius) as it must be steadily administered at regulated concentrations. Potassium nitrate is costly, limiting its use as a fertilizer.

SUMMARY

The inventions described and claimed herein have many attributes and aspects including, but not limited to, those set forth or described or referenced in this Summary. It is not intended to be all-inclusive and the inventions described and claimed herein are not limited to or by the features or embodiments identified in this Summary, which is included for purposes of illustration only and not restriction.

In some aspects, this disclosure provides compositions comprising potassium acetate wherein the potassium is in a water-soluble form for delivery to plants as part or all of a fertilizer composition. The potassium acetate solutions are derived from plant ash, preferably sunflower ash. Plant ash is produced from the burning of agricultural waste to recycle the nutritional components of the waste. However, it is difficult for plant ash to be directly administered as a liquid fertilizer because of solubility. One form of plant ash, sunflower ash, is derived from the burning or smoldering of sunflower seed husks. Sunflower husk ash can contain nutrients at levels sufficient for plants—phosphorus (10.94% $P_2O_5$, as sodium or potassium salts (w/w)), potassium (25.84% $K_2O$ eq., often in the form of $K_2CO_3$ or KOH), calcium (19.07% CaO), magnesium (18.58% MgO), but in water insoluble forms (Paleckiene et al., Pol. J. Environ. Stud. 2010; 19(5):973-979) and also some micronutrients (zinc, copper, cobalt, manganese, iron, and molybdenum). Thus, while plant ash may serve as a form of nutrients for fruit-bearing plants, plant ash does not present such nutrients in a water-soluble form which allows for facile plant uptake.

In some aspects, this disclosure provides for a method of making a potassium fertilizer composition by mixing a warmed extraction of plant ash with an aqueous $C_{1-4}$ monocarboxylic acid solution. The $C_{1-4}$ monocarboxylic acid is selected from acetic, formic, lactic, propionic, or butyric acid. The mixing time can be between 30 minutes and 24 hours, and at a temperature between ambient temperature and 70 degrees Celsius. In some aspects, the temperature during mixing is between ambient temperature and 60 degrees Celsius, optionally between 20 to 50 degrees Celsius. Ambient temperature can range from about 17 degrees Celsius to about 35 degrees Celsius, depending on season and location. The mixing time can be between 30 minutes to 96 hours, preferably from 1 to 3 hours. The combination of temperature and time can be adjusted to properly achieve maximum yield under given mixing conditions. The plant ash is selected from the ash from the fruit or skin (hull) of: pineapple, avocado, guava, banana, lemon, grapefruit, cucumber, orange, cantaloupe, apple, pear, sunflower, potato, sweet potato, sagebrush, rabbitbrush, pea, soybean, peanut, almond, and pistachio. In some aspects, the plant ash excludes potash comprising potassium chloride (KCl), potassium sulfate ($K_2SO_4$) or potassium nitrate ($KNO_3$). In some aspects, the plant ash excludes potassium nitrate, which is not permitted in Certified Organic substances.

In some aspects, the method can further comprise the step of filtering the $C_{1-4}$ monocarboxylate solution and plant ash mixture.

In some aspects, the method can further comprise a step of adjusting the pH of the potassium $C_{1-4}$ monocarboxylate solution to 6-7 by the titrated addition of citric acid. The citric acid can be in a powder or granular form.

In some aspects, the method can further comprise a step of obtaining Organic Certification of the composition from an appropriate jurisdictional authority. Obtaining Organic Certification involves submission of a process to auditing, inspection, and testing as set forth in the appropriate jurisdictional rules.

In some aspects, the concentration of the $C_{1-4}$ monocarboxylic acid is less than about 35 wt. % in water. In some aspects, the concentration of the potassium salt in the composition ranges from about 4 to about 15% (w/w). In some aspects, the potassium salt in the composition ranges from about 5 to about 14%. In some aspects, the potassium salt in the composition ranges from about 7 to about 13% (w/w). The potassium salt concentration can be further increased (by dewatering), using the methods described herein, or alternatively can be reduced (by dilution, with the addition of water).

In some aspects, the $C_{1-4}$ monocarboxylic acid is Certified Organic, the plant ash is Certified Organic, and/or the resulting potassium composition is Certifiably Organic.

In some aspects, the composition comprises a water-soluble potassium salt of the $C_{1-4}$ monocarboxylic acid. In some aspects, the composition further comprises a water-soluble calcium acetate salt. In some aspects, the composition has a turbidity of less than 50 NTU (Nephelometric Turbidity Units).

In some aspects, the potassium fertilizer comprises potassium in a substantially water-soluble form. In some aspects, the potassium fertilizer further comprises calcium, magnesium, and/or manganese in a substantially water-soluble form. The inventors have recognized that while plant ash may contain a variety of potential plant micronutrients, they are only present in water-insoluble forms and that by adding plant ash to a chelating mixture (which can include a $C_{1-4}$ monocarboxylic acid), the micronutrients can be brought into a water-soluble form.

In some aspects, this disclosure provides a foliar potassium fertilizer which may be registered for use in organic crop production.

In some aspects, this disclosure provides for a method of increasing fruit yield, the method comprising presenting by foliar application to plants capable of bearing fruit the composition comprising the potassium fertilizer made by the method of: (a) providing an aqueous solution of a $C_{1-4}$ monocarboxylic acid, (b) adding a plant ash to said $C_{1-4}$ monocarboxylic acid solution to form a potassium $C_{1-4}$ monocarboxylate solution, and (c) filtering the potassium $C_{1-4}$ monocarboxylate solution to obtain a water-soluble potassium $C_{1-4}$ monocarboxylate solution. In some aspects, the fruit yield of plants treated with the Certified Organic potassium acetate fertilizer compositions of this disclosure is increased relative to plants treated with a composition consisting essentially of potassium chloride (muriate of potash) and potassium sulfate (sulfate of potash) by more than 5%. In some aspects, the potassium content of the plant leaves is decreased during harvest of said fruit relative to plants treated with a composition consisting essentially of potassium chloride (muriate of potash) and potassium sulfate (sulfate of potash). The types of fruit for which the yield can be increased by using the potassium $C_{1-4}$ monocarboxylate fertilizer compositions of this disclosure can include or exclude: strawberries, berries, tomatoes, apples, pears, stonefruit (plums, nectarines, pluots, peaches, apricot, avocado, cherries), passionfruit, guava, grapes, citrus (oranges, lemons, grapefruit, pomelo, limes, clementines, tangarines), watermelons, cantaloupe, crenshaw melon, honeydew melon, kiwis, and cucumbers. As used herein, the term "berries" can include or exclude: blackberries, blueberries, boysenberries, marionberries, loganberries, and raspberries.

DETAILED DESCRIPTION

Definitions

Figure 1A:
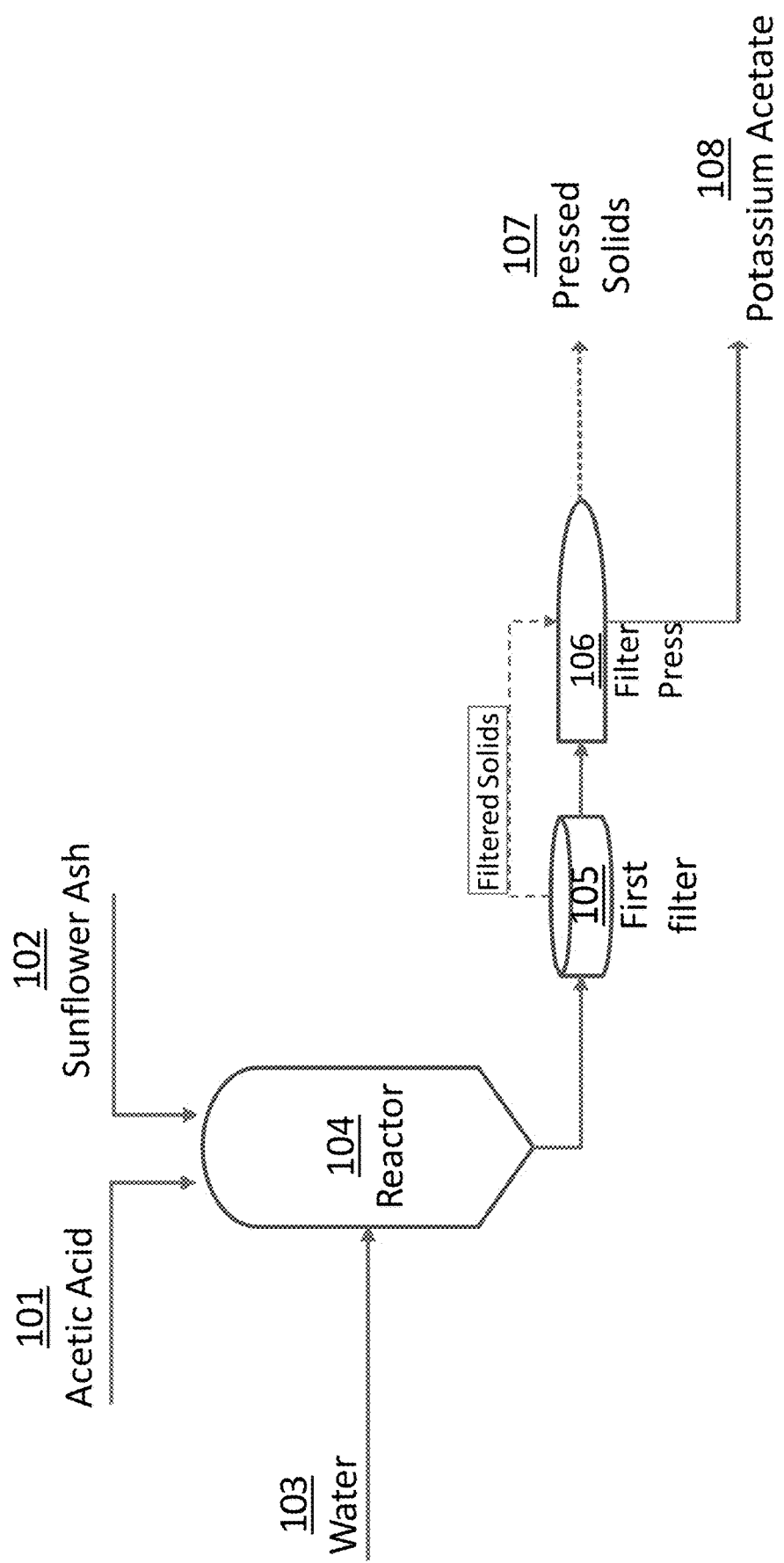
FIG. 1A shows one embodiment of the process for making Certifiably Organic potassium acetate from sunflower ash.

As used herein, the term "agitation" means a stirring action intended to increase the collisions between the plant ash and the aqueous $C_{1-4}$ monocarboxylic acid. In some embodiments, agitation is produced by rotating mixing blades in the mixing vessel, at a rate of 1 to $10^4$ $sec^{-1}$.

As used herein, the terms "Certified Organic" or "Certifiably Organic" refers to a product which may be registered for use in organic crop production and/or organic process handling in accordance with the United States National Organic Program standards. The purpose of "Organic" food and crop production is to grow food using inputs (e.g., fertilizer) which do not contain any amount of designated undesirable exogenous materials, which can include or exclude: pesticides, drugs, growth pathogens, and hormones.

As of September 2020, the pertinent U.S. legal standards describing "Certified Organic" are in 7 CFR 205.203. In particular, 7 CFR 205.203(d) sets forth the following requirements for Certified Organic fertilizer:

(d) A producer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;
(2) A mined substance of low solubility;
(3) A mined substance of high solubility: Provided, That, the substance is used in compliance with the conditions established on the National List of nonsynthetic materials prohibited for crop production;
(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and
(5) A plant or animal material that has been chemically altered by a manufacturing process: Provided, that, the material is included on the National List of synthetic substances allowed for use in organic crop production established in § 205.601.

(e) The producer must not use:
(1) Any fertilizer or composted plant and animal material that contains a synthetic substance not included on the National List of synthetic substances allowed for use in organic crop production;
(2) Sewage sludge (biosolids) as defined in 40 CFR part 503; and (3) Burning as a means of disposal for crop residues produced on the operation: Except, That, burning may be used to suppress the spread of disease or to stimulate seed germination.

The United States Department of Agriculture (USDA) regulates organic certification within the United States through a National Organic Program (NOP). To qualify to use the organic label the requesting organization must be certified as satisfying a variety of guidelines by an NOP accredited certification agency. One such requirement for certification is abiding by a National List that is produced by NOP. The National List identifies what can and cannot be included in certified organic products. Specifically, all nonsynthetic (natural) materials are allowed, unless specifically prohibited and synthetic substances and ingredients and nonagricultural substances are prohibited unless specifically allowed. In Europe, the same requirements for "organic" are applied, as set forth in Council Regulation (EC) No 834/2007, with one additional requirement—that mineral nitrogen fertilizers (e.g., nitrates) may not be used.

The USDA Guidance Document, "Materials for Organic Crop Production, NOP 5034-1" dated Dec. 2, 2016, lists the allowable materials for inclusion in "Certified Organic" fertilizers. Of pertinent part, "acetic acid" may be included when "made by oxidative or anaerobic fermentation; Reference: 7 CFR 205.105." Thus, the acetic acids of this disclosure are made by oxidative or anaerobic fermentation of plant matter. NOP 5034-1 also allows for "Natural citric acid produced from microbial fermentation of carbohydrate substances (e.g., sugar) is permitted. Production process may not use genetically modified microorganisms. Synthetic forms of citric acid are prohibited except as specified at § 205.601. Reference: 7 CFR 205.105 & 205.601(j)(7)." Thus, the citric acid (used for pH adjustment) of this disclosure is produced from microbial fermentation of carbohydrate substances. NOP 5034-1 also states that "Ash from plant and animal sources is permitted if it has not been treated or combined with prohibited substances; reference: 7 CFR 205.203(d)(4) & 205.602(a)." The only substances treated or combined with the plant ash of this disclosure are acetic acid or citric acid, as described herein. As each of the acetic acid and citric acid are not prohibited substances, the treated ash is therefore permitted for inclusion as a fertilizer input. In some embodiments, the potassium acetate compositions of this disclosure made by a process of mixing plant ash with acetic acid (and optionally citric acid) is therefore Certifiably Organic.

As used herein, when the term "Certifiably Organic potassium acetate" is used, the potassium acetate has been made by the limitations described herein for the production of Certified Organic substances. When the term "Certified Organic potassium acetate" is used, the potassium acetate has been Certified Organic by the applicable jurisdictional authorities, as described herein. Obtaining Organic certification involves the steps of obtaining governmental auditing, consideration, and approval of the manufacturing process such that the inputs are from Certified Organic sources and the processes do not add any non-Organic inputs to the resulting compositions.

The certifiably Organic acid used to make the Certifiably Organic or Certified Organic potassium acetate or citrate compositions of this disclosure satisfy the requirements of United States government standards (as of 2019) for Certified Organics, as described herein.

As used herein, the term "coarse screen" refers to a screen or mesh to separate solids from the water-soluble components of the mixture of plant ash and $C_{1-4}$ monocarboxylic acid, and can include a variety of screening techniques. The insolubles component can include or exclude silicates, insoluble metal oxides, fiber, and clays. The water soluble components can include acetate salts of the cations present in the plant ash, including potassium and calcium acetate salts. In some embodiments the course screen can be a mesh screen with pores having 18-60 mesh (a diameter of about 250 to about 1000 microns). In some embodiments, the coarse screen can be an 18 mesh screen with 1000 micron openings, 20 mesh screen with 841 micron openings, 25 mesh screen with 707 micron openings, 30 mesh screen with 590-595 micron openings, 35 mesh screen with 500 micron openings, 40 mesh screen with 400 micron openings, 45 mesh screen with 354 micron openings, 50 mesh screen with 297 micron openings, or 60 mesh screen with 250 micron openings, or other commercially available coarse screening technologies. A coarse screen may have opening so 250 microns or larger, or between any two of the recited sizes. In some aspects, the filter or mesh is made of metal, plastic, glass or ceramic. In some aspects, the plastic can be nylon. Sources of course and fine screen filters can include SWECO (Florence, KY, USA) and Midwestern Industries (Massillon, OH, USA), and Rusell Finex (Pineville, NC, USA), among others.

As used herein, the term "fine screen" refers to a screen or mesh with pores having about 35 to 400 mesh (a diameter of about 500 to 27 microns). The fine screen serves as one option to further extract the water-soluble component from the insolubles after the mixing of the plant ash and $C_{1-4}$ monocarboxylic acid. The insolubles component can include or exclude silicates, insoluble metal oxides, fiber, and clays. In some embodiments, the 30 mesh screen is a vibrating screen. In some embodiments, the water-soluble component can be passed through additional screens so as to reduce the turbidity of the solution to make it suitable for administration by spraying (for foliar application) or drip-line irrigation. In some embodiments the fine screen can be a mesh screen having 35 to 400 mesh may be used in the second screening step, for example, 35 mesh screen with 500 micron openings, 40 mesh screen with 400 micron openings, 45 mesh screen with 354 micron openings, 50 mesh screen with 297 micron openings, or 60 mesh screen with 250 micron openings, 70 mesh screen with 210 micron openings, 80 mesh screen with 177 micron openings, 100 mesh screen with 149 micron openings, 120 mesh screen with 125 micron openings, 140 mesh screen with 105 micron openings, 170 mesh screen with 88 micron openings, 200 mesh screen with 74 micron openings, 230 mesh screen with 63 micron openings, 270 mesh screen with 53 micron openings, 325 mesh screen with 44 micron openings or 400 mesh screen with 37 micron openings, or other commercially available fine screening technologies. A fine screen may have a mesh size between any two of the recited mesh sizes. In some aspects, the filter or mesh is made of metal, plastic, glass or ceramic. In some aspects, the plastic can be nylon.

An alternative method for "fine screening" can be achieved with the use of a filter press. Filter presses allow liquids containing suspended solids to be pumped into a series of plates containing filter cloths which retain solids above a certain opening size, and pass the liquid ("filtrate") downstream to be collected. The solids retained on the filter cloths can be collected and discharged periodically. As the input liquid can be pumped into the press at elevated pressures, the solids formed typically have a lower moisture content than those obtained by gravity screening methods and are referred to as press "cake". Filter presses can employ several plates and are expandable to increase surface area. Some presses use special filter plates which have a diaphragm embedded into them to allow dewatering of the press cake to a higher pressure than can be achieved with a standard design press. Filter cloths can have pore sizes ranging from coarse to very fine. Filter cloths ranging from 50 mesh (300 micron) to 1250 mesh (10 micron) are typical. Vendors for filter presses are many and can include Evoqua, Met-Chem, Pacific Press, Sperry, M.W. Watermark, and others.

As used herein, the term "grower's standard" refers to an inorganic potassium based fertilizer and other fertilizing regime with nutrient requirements standardized for a given crop, in current use by the grower. The form of potassium "Mopsol" can be in the form of a quick release (powders) or slow-release formulation (granulars). The potassium salts present in Grower's standard includes potassium chloride (muriate of potash) and/or potassium sulfate (sulphate of potash). While the subcomponents of a grower's standard may vary, the typical composition of a grower's standard are set forth in Table 1.

TABLE 1

Grower's Standard Nitrate Fertilizer Composition

| Analysis | Description |
| --- | --- |
| 20-00-11 | A/N Mopsol A/S Sol. |
| 46-00-00 | Urea |
| 00-00-62 | Muriate of Potash, Granular |
| 00-00-50 | Sulphate of Potash |
| 20% (wt.) | Iron Sulphate |
| 9.8% (wt.) | Magnesium Sulphate (Epsom Salt) |
| 32% (wt.) | Manganese Sulphate |
| 00-00-60 | Muriate of Potash, Soluable |

As used herein, the term "plant", as defined herein, includes any and all portions of a plant, including the root system, the shoot, including the stem, nodes, internodes, petiole, leaves, flowers, fruit, and the like, either prior to or post-harvest. Plant is also meant to include any cell derived from a plant, including undifferentiated tissue (e.g., callus) as well as plant seeds, pollen, propagules and embryos.

As used herein, the term "plant ash" refers to the residue obtained after burning plant matter. The plant matter can include or exclude leaves, fruits, shells, hulls, stems, skin, roots, and flowers. In some embodiments, the plant ash is sunflower hull ash. Sunflower hull ash comprises phosphorus, potassium, calcium, magnesium, and also some micronutrients (zinc, copper, cobalt, manganese, iron, and molybdenum). Because the plant is burned in the presence of oxygen, many metals are in the form of metal oxides, which are generally water insoluble. Calcium oxide, magnesium oxide, and silicates are the most common form of metal oxides. The plant ash is not obtained from mined mineral sources, and therefore excludes potassium chloride (muriate of potash) and potassium sulfate (sulphate of postash).

In some embodiments, the plant ash is obtained from the burnt fruit or skin (hull) of: pineapple, avocado, guava, banana, lemon, grapefruit, cucumber, orange, cantaloupe, apple, pear, sunflower, potato, sweet potato, sagebrush, rabbitbrush, pea, soybean, peanut, almond, and pistachio. In some embodiments, the plant ash can include or exclude ash from culled fruits, nuts or vegetables containing oils, for example, culled nut or, cucurbitaceae seeds. In some embodiments the culled nuts may include or exclude almonds, beech nuts, brazil nuts, cashews, hazelnuts, macadamia nuts, mongongo nuts, pecans, pine nuts, pistachios, peanuts, and walnuts. In some embodiments, the plant ash can be from burnt grapefruits, lemons, oranges, pomelos, and limes. In some embodiments, the cucurbitaceae seeds can include or exclude bitter gourds, bottle gourds, buffalo gourds, butternut squash seeds, pumpkin seeds, and watermelons. In some embodiments, the plant ash can be from amaranth, apricots, apple seeds, argan, avocados babassu, ben, borneo tallow nuts, cape chestnuts (also called yangu), carob pods (algaroba), cocoa, cocklebur, cohune coriander seeds, date seeds, dika, false flax, grape seed, hemp, kapok seeds, kenaf seeds, lallemantia, mafura, marula, meadowfoam seeds, mustard, *niger* seeds, poppyseeds, nutmeg, okra seeds, *papaya* seed ils *perilla* seeds, persimmon seeds, pequi, pili nuts, pomegranate seeds, poppyseeds, pracaxi, virgin pracaxi, prune kernels, *quinoa*, ramtils, rice bran, shea, sacha inchi, sapote, seje, tea seeds (*camellia*), thistle, tigernut (or nut-sedge), tobacco seeds, tomato seeds, and wheat germoil. In some embodiments, the plant ash can be ash from culled vegetable or fruit selected from: culled grapes, culled olives, culled corn (e.g., *Zea mays* Linn), culled bottle gourd (e.g., *Lagenaria siceraria*), culled carrot (e.g., *Daucus carota*), culled peas (e.g., *Pisum sativum*), culled potatoes (e.g., *Solanum tuberosum* L.), culled sugar beets (e.g., *Beta vulgaris* var. *altissima*), culled celery (e.g., *Apium graveolens*), culled tomatoes (e.g., *Lycopersicon esculentum* Mill.), culled members of the *brassica* genus (e.g., culled broccoli (e.g., *Brassica oleracea*), culled radish (e.g., *Brassica oleracea* B), culled cauliflower (e.g., *Brassica oleracea* C.), culled Brussel sprouts (e.g., *Brassica oleracea*), culled cabbage (e.g., *Brassica oleracea*), culled collard greens (e.g., *Brassica oleracea* A), culled kale (e.g., *Brassica oleracea* A), culled mustard greens (*Brassica juncea*), culled turnips (e.g., *Brassica rapa* var. *rapa*), and culled rutabaga (e.g., *Brassica napus* subsp. *rapifera*)), culled lettuce (e.g., *Lactuca sativa*), culled spinach (e.g., *Spinacia oleracea*), culled banana peels (e.g., Musa acuminate), culled watermelon (e.g., *Citrullus lanatus*), culled apples (e.g., *Malus domestica*), culled pineapples (e.g., *Ananas comosus*), culled grapes (e.g., *vitis* species, including *Vitis californica*), culled olives (e.g., *Olea europaea*), culled citrus (including orange (e.g., *Raphanus sativus*), squash (e.g., *Citrus×sinensis*), grapefruit (e.g., *Citrus×paradisi*), lemon (e.g., *Citrus×limon*), lime (e.g., *Citrus aurantifolia*), mandarin (e.g., *Citris reticulata*), and pomelo (e.g., *Citrus maxima*)), culled mangoes (e.g., *Mangifera indica*), culled members of the *fragaria* genus (e.g., strawberries (e.g., *Fragaria×ananassa*)), culled members of the *Vaccinium* genus (e.g., blueberries (e.g., *Vaccinium corymbosum* sect. Cyanoccocus), cranberries (e.g., *Vaccinium macrocarpon*), bilberries, whortleberries, lingonberries, cowberries, and huckleberries), culled sugar cane (e.g., *Saccharum officinarum*), culled members of the *Rubus* genus (e.g., blackberries (e.g., *Rubus fruticosus* species aggregate), boysenberries (e.g., *Rubus ursinus×R. idaeus*), raspberries (e.g., *R. idaeus* and *R. strigosus*, and hybrids thereof)), culled members of the *Prunus* genus (e.g., cherries (e.g., *Prunus avium*), plums (e.g., *P. domestica*), apricots (e.g., *P. armeniaca, P. brigantina, P. mandshurica, P. mume,* or *P. sibirica*), pluots (e.g., hybrids of *P. salicina* and *P. cerasifera*), peaches (e.g., *Prunus persica*)), culled pears (e.g., *Pyrus communis* subsp. *Communis*, the Chinese white pear (bai li) *Pyrus×bretschneideri*, and the Nashi pear *Pyrus pyrifolia* (also known as Asian pear or apple pear)), or mixtures or combinations thereof. The culled vegetable or fruit can be the entire plant or components thereof. The culled vegetable plant components can include or exclude: roots, leaves, stems, fruits, peels, seeds, flowers, tubers, pollen, and stalks.

In some embodiments, the plant ash is derived from burnt fruit or skin (hull) of a plant selected from: pineapple, avocado, guava, banana, lemon, grapefruit, cucumber, orange, cantaloupe, apple, pear, sunflower, potato, sweet potato, sagebrush, rabbitbrush, pea, soybean, peanut, almond, and pistachio.

As used herein, the term "mono $C_{1-4}$ carboxylic acid" or "$C_{1-4}$ monocarboxylic acid" refers to a carboxylic acid comprising from one to four carbons and having only one carboxylic acid functional group. $C_{1-4}$ monocarboxylic acids can include or exclude acetic acid, formic acid, propionic acid, pyruvic acid, lactic acid, butyric acid, and isobutyric acid. In some embodiments, the $C_{1-4}$ monocarboxylic acid is acetic acid. The acetic acid is sourced from Certified Organic sources, and therefore is itself Certified Organic. In some embodiments, the concentration of Certified Organic acetic acid used in the mixtures described in this disclosure are at a concentration of less than 35% (w/w) in water. The concentration of the acetic acid can be adjusted to maximize the final concentration of the potassium acetate in the mixture, while minimizing mixing time, bubbling, caustic exposure to the operator and/or mixing and packaging machinery.

As used herein, the term "substantially soluble" refers to the solubility of a solute in a solvent (preferably an aqueous solvent) wherein the solubility is such that the turbidity of any undissolved solute results in a turbidity of less than 100 NTU, preferably less than 50 NTU.

Importance of Certified Organic Potassium Acetate

There is an increasing demand for organic products. The "Certified Organic" labeling and terminology has been developed to define products or produce certified by recognized organizations as meeting the applicable agency standards and product or produce made by methods that meet the agency standards for organic production methods. An essential aspect of certified organic food production is the necessity of using production means that are certified organic, which can include or exclude: fertilizers, which are either approved for organic use, which can include or exclude materials containing no pathogens or other disqualifying components, or regulated and accepted, such as manures, composts and the like that meet the applicable standards.

There is a substantial need for environmentally and economically acceptable technologies for disposal of manure, for control of noxious and greenhouse gases from animal feeding operations, and for production of organic fertilizer and soil builder products that can be certified for food production under established standards for certified organic food production. The present invention is directed to methods, apparatus, systems and products for these needs.

The conversion of plant ash (e.g., sunflower ash) to soluble forms of potassium acetate has great potential for upgrading low-value plant ash to higher value forms of chemicals for agricultural use.

Methods of Making Organically Certifiable Potassium Acetate

The potassium acetate compositions described herein can be made by mixing a Certified Organic plant ash with a Certified Organic $C_{1-4}$ monocarboxylic acid (e.g., acetic acid). In some embodiments, the Certified Organic $C_{1-4}$ monocarboxylic acid is in an aqueous form. In some embodiments, the Certified Organic plant ash is in a slurry form. The Certified Organic plant ash comprises a significant portion of insoluble matter, such that the plant ash cannot be entirely dissolved in water alone. The inventors have recognized that by first forming a metal-chelating solution by dissolving a Certified Organic $C_{1-4}$ monocarboxylic acid in solution, followed by adding plant ash at elevated temperature, and optionally followed by solids removal by one or a plurality of filtration steps, a water-soluble potassium $C_{1-4}$ monocarboxylate solution can be produced. In addition, in some embodiments, the water-soluble potassium $C_{1-4}$ monocarboxylate solution can further comprise water-soluble metals which can include or exclude magnesium, manganese, copper, nickel, and calcium.

In some embodiments, the plant ash (e.g., sunflower ash) can be mixed with an aqueous $C_{1-4}$ monocarboxylic acid solution which is at ambient temperature, followed by heating the mixture to a temperature of between 20 degrees Celsius to 70 degrees Celsius for a time between 30 minutes and 96 hours. In some embodiments, the aqueous $C_{1-4}$ monocarboxylic acid solution is pre-warmed to the desired temperature range before addition of the plant ash. While the time and temperature of the mixing can be varied, the inventors have recognized that the most preferable compositions can be formed by mixing the plant ash (e.g., sunflower ash) with the aqueous $C_{1-4}$ monocarboxylic acid solution for a time between 1 to 4 hours and a temperature between 20 to 55 degrees Celsius.

The form of potassium in sunflower ash can include significant amounts of potassium carbonate ($K_2CO_3$) and/or potassium bicarbonate ($KHCO_3$). Mixing these forms of potassium with an acid source will yield significant amounts of released carbon dioxide gas, which may cause bubbling and perturb efficient mixing of the components. In some embodiments, the addition of the plant ash is added in aliquots, or continuously but at a measured addition rate, so as to control the amount of bubbling in the mixture. In some embodiments, the measured addition rate is controlled such that the plant ash is added in about equal amounts over a time of between 30 to 60 minutes. In some embodiments, the measured addition rate is controlled such that successively increasing amounts of the plant ash are added over a time between 30 to 60 minutes.

In some embodiments, the order of addition of plant ash, acid, and optionally water can be in any order. For example, in some embodiments, the plant ash can be added to water first, followed by the addition of acid. In some embodiments, the acid and water are premixed, then added to the plant ash. In some embodiments, the acid and water are premixed, to which then the plant ash is added. In some embodiments, the plant ash and acid are premixed, and then water is added.

In some embodiments, the relative weight percent of plant ash (measured by K2O equivalents) added to the acid and optionally water can range from 15 to 35%. In some embodiments, the relative weight percent of acid (as a 30% weight concentration itself in water) can range from 15 to 85%. In some embodiments, the relative weight percent of water can range from 0 to 35%.

In some embodiments, the solids removal by one or a plurality of steps. The solids-removal steps can include or exclude a filtration step. The solids removal steps can include or exclude: vibratory filter, membrane filter, screens, or gravitational sedimentation. The amount of solids removed from the mixing solution can be up to 30% (w/w) of the total initial starting components.

In some embodiments, the water-soluble potassium acetate solutions of this disclosure can be further mixed with agents to increase their suitability as a foliar-applied fertilizer. Such agents can include or exclude: excipients, surfactants, spreaders, thickeners, crop oils, ammonia ($NH_3$), ammonium phosphate, urea, elemental sulfur (S), and/or organic forms of sulfur.

In some embodiments, the water-soluble potassium acetate solutions of this disclosure can be converted into a form of dried fertilizer for soil-based application. The aqueous solutions can be dried, with or without the presence of added compounders, binders, aggregating agents, and the like. The dried potassium acetate compostions can be in powder, or granular form.

In some embodiments, the methods to make the Certified Organic potassium $C_{1-4}$ monocarboxylate salts of this disclosure can include the measured addition of plant ash to an aqueous solution of the corresponding $C_{1-4}$ monocarboxylic acid. Plant ash comprises potassium carbonate salts resulting from the oxidative burning of organic matter. The carbonate salts, when mixed with $C_{1-4}$ monocarboxylic acids (e.g., acetic acid) will produce bubbling from the resulting release of carbon dioxide. To control the bubbling rate of the released carbon dioxide, the addition of plant ash is measured so as to prevent overbubbling which could result in overflow from the mixing vessel. In some embodiments, the plant ash is added to the aqueous $C_{1-4}$ monocarboxylic acid at a rate of of 1-1.5% of the target solution weight per minute, such that plant ash is added over a time period ranging from 40 to 60 minutes.

Systems for Producing Certified Organic Potassium Acetate

In one embodiment, the method of producing the Certified Organic potassium acetate composition involves mixing water, a $C_{1-4}$ monocarboxylic acid, and plant ash which can be added in any order. Following mixing, solids-liquid separation can be performed by a method which can include or exclude gravity separation, vibratory screening, centrifugal screening, centrifugation, filter pressing, or others, alone or in combination with each other.

In some embodiments, the composition comprising Certified Organic potassium acetate is further concentrated or evaporated to dryness. The Certified Organic potassium acetate can be concentrated by removal of water by methods well-understood in the art, including evaporation, lyophilization, distillation, and the like. In some embodiments, the processes used to make the Certified Organic potassium acetate compositions described herein can include a concentration step using vibratory filtration equipment (which can include or exclude those which are manufactured by New Logic) or vacuum evaporation equipment (which can include or exclude those manufactured by Buflovak or Vobis).

In some embodiments, the processes used to make the Certified Organic potassium acetate compositions can include a separation method, e.g., using a filter press, screw press, belt press, or hydraulic press to produce a water-soluble fraction and a solids fraction.

Potassium $C_{1-4}$ Monocarboxylate Solutions

In some embodiments, potassium $C_{1-4}$ monocarboxylate solutions of this disclosure can comprise potassium acetate, potassium formate, potassium propionate, potassium butyrate, potassium pyruvate, and/or potassium lactate. The amount of the potassium (as $K_2O$ eq.) in the mixture of plant ash and $C_{1-4}$ monocarboxylic acid can vary as per the amount of added water, but can range from about 5%-15% (w/w), preferably from 7-10% (w/w) and can further be adjusted post-mixing by water removal methods as described herein to increase the concentration of potassium $C_{1-4}$ monocarboxylate, or dilution with an aqueous solution to reduce the concentration of the potassium $C_{1-4}$ monocarboxylate.

The inventors have discovered that the use of acetic acid to neutralize the potassium salts in the plant ash can solubilize otherwise insoluble metal oxides. For example, calcium present in the plant ash is mainly comprised of calcium oxide, an insoluble oxide. However, when mixed with acetic acid at elevated temperature, the calcium is equilibrated into a water-soluble calcium acetate salt. By a similar mechanism, manganese, magnesium, and copper oxides are made water-soluble by the use of acetic acid with the plant ash. The inventors have surprisingly discovered that compositions comprising the primary fertilizer nutrient potassium can be made with concomitant amounts of micronutrients (copper, manganese, and/or magnesium) by shifting the relative solubility of the oxides into water using acetic acid.

In some embodiments, the amount of micronutrients in the potassium $C_{1-4}$ monocarboxylate solutions of this disclosure can range as follows: boron 0 to 150 ppm, calcium 0.1 to 0.9 wt. %, iron 20 to 120 ppm, magnesium 0.5 to 2.5 wt. %, manganese 10 to 45 ppm, molybdenum 0.2 to 4.0 mg/kg, nitrogen 0.01 to 0.1 wt. %, and sulfur 0.01 to 0.4 wt.

In some embodiments, the relative concentration of potassium acetate to other potassium salts can be increased by lowering the temperature after mixing the plant ash with acetic acid at elevated temperature followed by filtration using one or a plurality of filtration step, and then performing another filtration step. For example, the solubility of potassium acetate in water at 20 degrees Celsius is about 256 g/L, and at 0 degrees Celsius is about 216 g/L, resulting in a relatively minor 15% decrease in solubility. In contrast, the solubility of potassium chloride at 20 degrees Celsius is about 34.2 g/L, and at 0 degrees Celsius is about 28 g/L, resulting in a decrease of 18%. Thus, by lowering the temperature of the solution before filtering, the relative abundance of the potassium acetate salt can be increased over the potassium chloride salt. Similar mechanisms can be used for increasing the relative abundance of potassium acetate salts over other salts in the water-soluble solution after mixing plant ash with acetic acid.

In one embodiment, the pH of the aqueous potassium acetate solution is from 6 to 8 after mixing the plant ash with the heated aqueous solution of the $C_{1-4}$ monocarboxylic acid. In some embodiments, the pH can be further modulated by the addition of powdered citric acid. The citric acid itself is derived from fermentation of plant matter, and therefore also qualifies as a Certified Organic substance. The citric acid is added in dry form so as to not dilute the potassium acetate concentration.

As a foliar applied fertilizer component, potassium acetate solutions are ideally presented to the plant leaves at a neutral to slightly acid pH range (5.7-7). Most plant nutrients are optimally available to plants within a 6.5 to 7.5 pH range, and this range of pH is compatible to plant root growth. In some embodiments, the pH of the potassium acetate solution ranges from 4.5 to 8.5. In some embodiments, the pH of the potassium acetate solution ranges from 6 to 7.5. In some embodiments, the pH of the potassium acetate is selected from: 6.0, 6.1, 6.2, 6.3, 6.4, 6.5, 6.6, 6.7, 6.8, 6.9, 7.0, 7.1, 7.2, 7.3, 7.4, 7.5, or between any of the aforementioned pH levels. The pH of the potassium solutions of this disclosure are not higher than 8.5, because that would lead to nutrient deprivation and/or leaf wilting if used for foliar application.

In some embodiments, the potassium acetate solutions described in this disclosure may still comprise small particles after the solids-removal process. The amount of solids can be measured using turbidity-measurement instruments (e.g., Hach Solitax sc Sensor for Turbidity). In some embodiments, the turbidity of the potassium acetate solutions described in this disclosure after the solids-removal process can have a turbidity of less than 500, 450, 400, 350, 300, 250, 200, 150, 100, 90, 80, 70, 60, 50, 40, 30, 20, or 10 NTU. The turbidity can be measured directly after the final solids-removal step (e.g., filtration), or after the solution is optionally diluted.

Use of Potassium Acetate Solutions
Deicing

Potassium acetate is commonly used in commercial deicers to remove ice and prevent its formation. Potassium acetate can be used as a substitute for sodium chloride, calcium chloride, or magnesium chloride deicing applications. Potassium acetate is less aggressive on soils and much less corrosive, and therefore is suitable for airport runways. It is, however, more expensive. The Certified Organic potassium acetate compositions of this disclosure can be used as more environmentally friendly deicers because they are sourced from Certified Organic sources.

Fire Extinguishing

Potassium acetate is the extinguishing agent used in Class K fire extinguishers because of its ability to cool and form a crust over burning oils. The potassium acetate compositions of this disclosure can be formulated (e.g., concentrated) to be administered as a mist to terminate fires generated from burning oils. The potassium acetate compositions of this disclosure can be used as Certified Organic flame retardants because they are sourced from Certified Organic substances.

Fertilizer

In some embodiments, the compositions comprising Certifiably Organic potassium acetate can eliminate or reduce the use of conventional inorganic potassium based fertilizers which can include or exclude: potassium chloride (muriate of potash), potassium nitrate, potassium sulfate (sulfate of potash), potassium thiosulfate, or other inorganic potassium based fertilizers, while also improving crop yields relative to the use of inorganic potassium fertilizers alone. The aforementioned compositions of this disclosure may promote faster initial growth after germination, increase root growth, increase canopy growth, increase field and/or greenhouse crop yields and/or increase the quality or flavor of the produce relative to the use of inorganic potassium fertilizers alone, for example by increasing the levels of sugar and/or other flavor components. Moreover, when the aforementioned compositions of this disclosure are used in combination with conventional inorganic potassium fertilizers, fruit yield is improved.

In one embodiment the compositions comprising Certifiably Organic potassium acetate may act as fertilizers. The fertilizers of this disclosure may be applied using irrigation drip lines or foliar application. In some embodiments, the foliar application may be achieved by spraying the composition in liquid form on top of plants. Potassium acetate plant uptake is most likely to occur via interaction with the plant leaves, so foliar application is preferred. In some embodiments, the compositions comprising Certifiably Organic potassium acetate are diluted prior to use. For example, the compositions comprising Certifiably Organic potassium acetate may be diluted with water to $1/5$, $1/6$, $1/7$, $1/8$, $1/9$, $1/10$ or in some applications, to as little as 5%, 4%, 3%, 2%, or 1% or less prior to use. In some embodiments, the compositions comprising Certifiably Organic potassium acetate may be presented in a dry powder form, and dissolved in water prior to use. In some embodiments, the compositions comprising Certifiably Organic potassium acetate is applied to crops by spraying, preferably via a sprinkler. In some embodiments, the compositions comprising Certifiably Organic potassium acetate is blended with a soil amendment, e.g., manure, hydrolysates including those described in U.S. Pat. No. 10,214,458 (herein incorporated by reference), or rendering byproducts, before application of the soil amendment to the soil before or during plant growth.

In some embodiments, the rates of application of the Certified Organic potassium acetate fertilizer compositions of this disclosure can range from 1 quart (US) to 1 gallon (US per acre for foliar application, and 0.5 gallons (US) to 1 gallon (US) per acre for soil application. The temperature, crop type, and field use history will determine variations in the application rate of the fertilizer.

In another embodiment, this disclosure relates to a method of increasing the yield of fruit, the method comprising applying by foliar application a composition comprising Certifiably Organic potassium acetate compositions made by a process comprising mixing plant ash, preferably sunflower ash, with heated Certifiably Organic acetic acid, wherein the yield of fruit is increased by at least 5% compared to treatment with inorganic potassium salts alone. In some embodiments, the Certifiably Organic potassium acetate composition made by a process comprising mixing plant ash, preferably sunflower ash, with heated Certifiably Organic acetic acid is applied in combination with inorganic potassium salts, either through separate application on the same or different schedules, or by combining the two components in a mixture. For example, the compositions comprising a Certifiably Organic potassium acetate composition and an inorganic potassium salt composition may be applied in a 90:10, 85:15, 80:20, 75:25, 70:30, 65:35, 60:40, 55:45 50:50, 45:55, 40:60, 35:65, 30:70, 25:75, 20:80, 15:85, or 10:90 mixture (v/v) or any ratio between any of the aforementioned ratios.

In some embodiments, application of the Certifiable Organic potassium acetate fertilizers of this disclosure increase crop yield relative to the use of inorganic potassium fertilizers alone. Preferably the use of the Certifiable Organic potassium acetate fertilizers of this disclosure increase crop yield relative to inorganic potassium fertilizers alone by at least 5%, 10%, 15%, 20%, 25%, 30%, 35% 40%, 45%, 50%, 60%, 70%, 80%, 90%, 100%, 200%, 300%, or 400%, over a growing season or contiguous partial growing season.

When used as a fertilizer, the potassium acetate compositions of this disclosure provide higher crop yields by, for example, increasing water, potassium, and/or sugar flow to fruits or flowering fruits. The type of fruits for which the crop yield can be increased or sustained by foliar application of the Certifiable Organic potassium acetate compositions of this disclosure can include or exclude: strawberries, berries (blackberries, blueberries, boysenberries, marionberries, loganberries, raspberries), tomatoes, apples, pears, stonefruit (plums, nectarines, pluots, peaches, apricot, avocado, cherries), grapes, citrus (oranges, lemons, grapefruit, pomelo, limes, clementines, tangarines), watermelons, cantaloupe, crenshaw melon, honeydew melon, sprite melon, Charentais melon, Korean melon, bailan melon, hami melon, honey globe melon, new century melon, kiwis, and cucumbers.

As used herein, the term "crop yield" refers to a measurement of the amount of a crop that was harvested per unit of land area. Crop yield can also refer to the actual seed generation from the plant. The unit by which the yield of a crop is measured is kilograms per hectare, bushels per acre, or tons per acre.

In some embodiments, this disclosure includes compositions comprising Certifiably Organic potassium acetate made by the methods described herein, optionally with one or more agriculturally acceptable carriers or excipients. The term "carriers" includes water, buffer solutions, carbohydrate containing solutions, saline solutions and any other material suitable for the maintenance of plants. The term "excipient" refers to additives, which can include or exclude surfactants, antioxidants, nutrients, and fungicides as described herein.

Not wishing to be bound by theory, it is believed that $C_{1-4}$ monocarboxylate salts can increase fruit yield by being readily absorbably through the plant cuticle and utilized for a variety of plant metabolic processes. In particular, acetate salts are known to (1) increase water uptake, (2) increase production of sugars, (3) increase plant vigor, (4) translocate starches, sugars, and fats in the vascular system, and (5) increase translocation of potassium from the plant to the fruit, as evidenced by a higher fruit population and/or an increase in average fruit weight (Jackson et al., Plant Physiol. 1970 October; 46(4): 538-542; Kraffczyk, et al., Soil Biology & Biochemistry, 16 (1984), pp. 315-322; Adeleke et al., South African Journal of Botany, Volume 108, January 2017, Pages 393-406; Fischer et al. Soil Biology and Biochemistry, Volume 42, Issue 2, February 2010, Pages 186-192).

EXAMPLES

Example 1. Procedure to Make Potassium Acetate

Materials and Methods

The acetic acid was made by the acetous fermentation of dilute organic ethyl alcohol. The alcohol was converted to acetic acid by the microorganism *Acetobacter aceti* in vinegar acetators. The acetic acid was prepared in accordance under the Federal guidelines for Good Manufacturing Practices. The acetic acid was free of clarifiers, preservatives or other impurities (including potassium, calcium, manganese, and magnesium). The acetic acid was certified organic by Quality Assurance International (QAI). The acetic acid was at a concentration of 30 wt. % (300 g/L) in water.

The plant ash was sunflower hull ash. The sunflower ash composition consisted of the components as identified in Table 2. The Calcium content at 7.85 wt. % is in multiple forms, including calcium carbonate, calcium oxide, calcium silicate, calcium chloride, calcium sulfate, and calcium bicarbonate. The calcium carbonate equivalent includes calcium and other metal carbonate (eg., $MgCO_3$, $MnCO_3$, $CuCO_3$) compounds.

TABLE 2

Sunflower ash composition.

| Parameter | Analysis | Units |
|---|---|---|
| Phosphate, Total (as $P_2O_5$) | 4.78 | % |
| Potassium, water soluble (as $K_2O$ eq.) | 40.13 | % |
| Sulfur | 4.47 | % |
| Boron | 0.05 | % |
| Calcium | 7.85 | % |
| Cobalt | 1 | ppm |
| Iron | 0.11 | % |
| Magnesium | 4.8 | % |
| Manganese | 165 | ppm |
| Molybdenum | 4.5 | ppm |
| Sodium | 0.11 | % |
| Zinc | 335 | ppm |
| Calcium Carbonate Equivalent | 55.34 | % |
| Arsenic, total | 1.2 | mg/Kg |
| Cadmium, total | 0.01 | mg/Kg |
| Chromium, total | 0.01 | mg/Kg |
| Copper, Total | 0.01 | mg/Kg |
| Lead, Total | 0.1 | mg/Kg |
| Mercury, Total | 0.01 | mg/Kg |

Figure 1B:
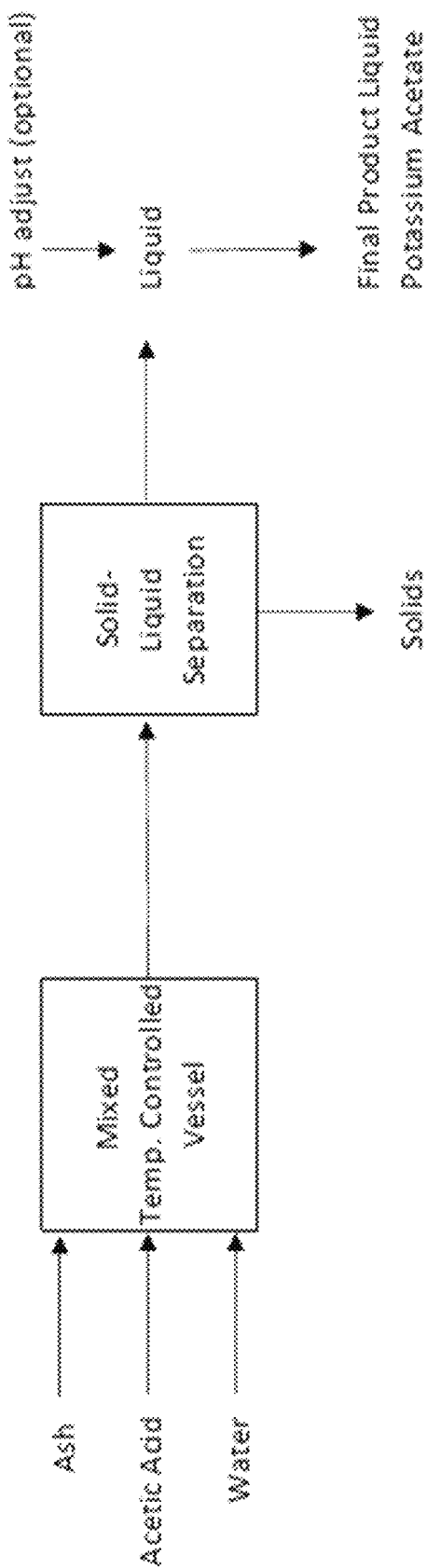
FIG. 1B shows one embodiment of the process for making Certifiably Organic potassium acetate from plant ash.

As shown in FIG. 1B, sunflower ash and acetic acid (at 30 wt. % concentration) were mixed with water, followed by one or a plurality of filtration steps to yield separated potassium acetate solution. Reaction parameters which can include or exclude concentration, temperature, and speed of mixing are expected to impact the final potassium recovery yield because of parameters such as viscosity, the degree of sunflower ash grinding (fibrous material may preclude full potassium recovery), and the lot to lot variation from the original sunflower source.

Example 2: Optimizing Mixing Conditions—Input Ratios

Water, acid, and ash were mixed together in 100 mL flasks for the designated time as shown in the Table 3 below. The slurry was then centrifuged at 5000×G for 10 minutes and supernatant decanted for analysis. Initial plant ash $K_2O$ eq. concentration was assumed to be 40% by mass. Estimated $K_2O$ eq. recovery is shown in Table 3 which accounts for both mass and concentration yield as compared to initial mass available.

TABLE 3

Example 2 conditions.

| Scale | Ash Mass % | Water Mass % | Acid (30%) Mass % | Temp C. | Time hours | $K_2O$ eq. Conc % | pH | Overall Mass Recovery % of theoretical |
|---|---|---|---|---|---|---|---|---|
| Lab | 17% | 0 | 83% | 20 | 24 | 5.64 | 4.8 | 18 |
| Lab | 20% | 0 | 80% | 20 | 24 | 6.12 | 5.0 | 22 |
| Lab | 25% | 0 | 75% | 20 | 24 | 9.61 | 5.5 | 39 |

TABLE 3-continued

Example 2 conditions.

| Scale | Ash Mass % | Water Mass % | Acid (30%) Mass % | Temp C. | Time hours | $K_2O$ eq. Conc % | pH | Overall Mass Recovery % of theoretical |
|---|---|---|---|---|---|---|---|---|
| Lab | 17% | 83% | 0 | 20 | 24 | 6.34 | 11.0 | 61 |
| Lab | 20% | 80% | 0 | 20 | 24 | 7.28 | 11.6 | 52 |
| Lab | 25% | 75% | 0 | 20 | 24 | 9.46 | 11.9 | 31 |

Samples extracted with acetic-acid resulted in mild-acid pH liquids, while water-extracts were highly alkaline. The best overall mass recovery for acetate extracts here used 25% initial ash content, resulting in the best liquid yield with the highest potassium concentration. For water extracts, all concentrations were near expected theoretical values, but liquid yields were better for lower starting solids contents. Only the mixtures with added acid resulted in compositions with a final pH appropriate for fertilizer use (ie., below pH 8) without significant addition of citric acid for post-mixing pH adjustment.

Example 3: Optimizing Mixing Conditions—Long Duration

Different incubation temperatures of 20 C or 50 C were used following the method described in Example 2. The tested incubation and times are summarized in Table 4.

TABLE 4

Example 3 conditions.

| Scale | Ash Mass % | Water Mass % | Acid (30%) Mass % | Temp C. | Time hours | $K_2O$ eq. Conc % |
|---|---|---|---|---|---|---|
| Lab | 25% | 25% | 50% | 20 | 4 | 7.46 |
| Lab | 25% | 25% | 50% | 50 | 4 | 7.22 |
| Lab | 25% | 25% | 50% | 20 | 96 | 8.02 |
| Lab | 25% | 25% | 50% | 50 | 96 | 9.91 |

Similar concentrations were observed for both temperature conditions after 4 hours. After 96 hours incubation the 20° C. sample increased concentration by >7% while the 50° C. sample increased by >35%. Thus, performing the reaction at elevated temperature resulted in a higher overall potassium concentration when performing the reaction at extended duration (96 hr).

Example 4. Optimizing Mixing Conditions—Short Duration

Different incubation times from 1-24 hours were used following the method described in Example 2. The tested time and temperatures are listed in Table 5.

TABLE 5

Example 4 conditions.

| Scale | Ash Mass % | Water Mass % | Acid (30%) Mass % | Temp C. | Time hours | $K_2O$ eq. Conc % |
|---|---|---|---|---|---|---|
| Lab | 25% | 25% | 50% | 20 | 1 | 7.21 |
| Lab | 25% | 25% | 50% | 20 | 2 | 7.04 |

TABLE 5-continued

Example 4 conditions.

| Scale | Ash Mass % | Water Mass % | Acid (30%) Mass % | Temp C. | Time hours | $K_2O$ eq. Conc % |
|---|---|---|---|---|---|---|
| Lab | 25% | 25% | 50% | 20 | 24 | 7.26 |
| Lab | 25% | 25% | 50% | 50 | 24 | 7.66 |

No significant change in potassium concentration between 1- and 24-hour extraction times were observed at 20 C, however a slight increase in concentration over 24 hours was observed at 50 C vs. 20 C.

Example 5. Optimizing Mixing Conditions—Acid Concentration

Different acid concentrations are used with a 1-hour incubation time following the method described in Example 2. The tested acid concentrations are listed in Table 6. No significant change in potassium concentrations were observed between extraction conditions shown.

TABLE 6

Example 5 conditions.

| Scale | Ash Mass % | Water Mass % | Acid (30%) Mass % | Temp C. | Time hours | $K_2O$ eq. Conc % |
|---|---|---|---|---|---|---|
| Lab | 25% | 25% | 50% | 50 | 1 | 7.07 |
| Lab | 25% | 12% | 63% | 50 | 1 | 6.96 |
| Lab | 25% | 0% | 75% | 50 | 1 | 7.28 |

Example 6: Evaluating Compositional Analysis of Potassium Acetate Solutions

A lab scale extraction of 25% ash, 25% water, and 50% 300-grain acetic acid was performed at 50 C for 15-hours, followed by centrifugation and decanting as described in Example 2. Supernatant liquid compositional analyses are shown in Table 7 (AR=relative amount). The Calcium content which started at 7.85 wt. % in the plant ash (as described in Example 1) is in multiple forms, including calcium carbonate, calcium oxide, calcium silicate, calcium chloride, calcium sulfate, and calcium bicarbonate. Not all forms of calcium are water soluble, or even convertible with acetic acid into water soluble form, as evidenced by the low calcium content in the liquid filtrate (here, 0.54 wt %).

TABLE 7

Example 6 detailed liquid analysis.

| Constituent/Units (AR = As Received) | Value |
|---|---|
| Potash ($K_2O$ eq.) (soluble) AR % | 8.84 |
| Arsenic (total) AR mg/kg | n.d. |
| Boron (total) AR ppm | 111 |
| Cadmium (total) AR mg/kg | n.d. |
| Calcium (total) AR % | 0.54 |
| Chloride AR % | 0.6 |
| Cobalt (total) AR mg/kg | n.d. |
| Copper (total) AR ppm | n.d. |
| Iron (total) AR ppm | 86.8 |
| Lead (total) AR mg/kg | n.d. |
| Loss on ignition (OM) AR % | 19.9 |

TABLE 7-continued

Example 6 detailed liquid analysis.

| Constituent/Units (AR = As Received) | Value |
|---|---|
| Magnesium (total) AR % | 1.38 |
| Manganese (total) AR ppm | 26.7 |
| Mercury (total) AR mg/kg | n.d. |
| Molybdenum (total) AR mg/kg | 1.1 |
| Nickel (total) AR mg/kg | n.d. |
| Nitrogen (total) AR % | 0.06 |
| Phosphate (available $P_2O_5$) AR % | n.d. |
| Phosphorus (total) AR % | n.d. |
| Selenium (total) AR mg/kg | n.d. |
| Sodium (total) AR % | 0.04 |
| Sulfur (total) AR % | 0.09 |
| Zinc (total) AR mg/kg | n.d. |

Example 7: Scaling Up Optimal Mixing Conditions

A 20,000 lb production scale extraction of 25% ash, 25% water, and 50% 300-grain acetic acid at 50 C was performed for 1-hour, followed by filtration with a centrifugal screener (Russell Finex Liquid-Solid Separator, 300 micron screen). Water and acid were preheated in a mixed stainless-steel steam jacketed reactor vessel prior to addition of ash at a rate of approximately 0.33 lb sunflower plant ash/lb liquid/hr. Less than 5% of the water was reserved and sprayed onto the surface of the reactor during mixing to suppress foaming. Aliquots at three stages of the process were taken and analyzed for $K_2O$ eq. wt. % concentration: decanted supernatant, filtered supernatant, and the collected filtered solids. The $K_2O$ eq. wt. % concentration is listed in Table 8.

TABLE 8

Example 7 sample results.

| Sample ID | $K_2O$ eq. Conc % |
|---|---|
| Decanted Supernatant | 7.49 |
| Filtered Supernatant | 7.61 |
| Filtered Solids | 9.58 |

No observable differences in concentration were observed between decanted and filtered solutions, however filtered coarse solids were separated easily and contained a slightly higher $K_2O$ eq. concentration than the liquid. The resultant liquid still contained visible black ash. Less than 1% of the total input mass was recovered as filtered solids, indicating that most of the initial plant ash was converted into a water-soluble form.

Example 8. Monitoring $K_2O$ Budget During Solids Separation Step

Following the method of Example 7, a production scale extraction of 25% ash, 25% water, and 50% 300-grain (30 wt. %) acetic acid was performed at 50 C for 1-hour, followed by centrifugation (Flottwegg Z4 tricanter) and plate-and-frame filtration (Terrace international, membrane diaphragm filter press with <25 micron cloths). The solids content, mass yield, and $K_2O$ eq. concentration (wt. %) of the liquid filtrate and presscake (isolated solids) are listed in Table 9. The % solids was determined after evaporation. It was found that while some residual $K_2O$ eq. was found in the press cake, the press cake was only about 22 wt. % of the overall content, indicating that most of the $K_2O$ are in the liquid filtrate solution com

TABLE 9

Example 8 results.

| Sample ID | Solids % | Mass Yield % | $K_2O$ eq. Conc % |
|---|---|---|---|
| Liquid Filtrate | 16.7 | 78 | 7.87 |
| Press Cake | 46.3 | 22 | 9.97 |

Filter press clarification by pumping to 0.8 Mpa followed by cake dewatering at 1.2 MPa produced a well compacted cake and clear liquid. Additional dewatering increased product yield into the liquid by 5%. Detailed cake compositional analysis is listed in Table 10. Note that all phosphorous is partitioned into cake-solids fraction during filtration.

TABLE 10

Example 8 press-cake compositional analyses.

| Constituent/Units (AR = As Received) | Value |
|---|---|
| Potash ($K_2O$ eq.) (soluble) AR % | 9.97 |
| Phosphate (available P205) AR % | 3.1 |
| Nitrogen (total) AR % | 0.1 |
| Ammonium nitrogen (total) AR % | 0.02 |
| Loss on ignition (OM) AR % | 16.4 |
| Boron (total) AR ppm | 382 |
| Calcium (total) AR % | 7.92 |
| Copper (total) AR ppm | 292 |
| Iron (total) AR ppm | 1110 |
| Magnesium (total) AR % | 2.69 |
| Manganese (total) AR ppm | 328 |
| Sodium (total) AR % | 0.06 |
| Sulfur (total) AR % | 3.86 |
| Zinc (total) AR ppm | 389 |

Example 9: Establishing the Repeatability of the Optimal Mixing Conditions

Following the method of Example 7, a production scale extraction of 25% ash, 25% water, and 50% 300-grain acetic acid was performed at 50 C for 1-hour, followed by screening (Sweco vibratory screener with 74 micron screen) and plate-and-frame filtration (MW Watermark Filter standard filter press with <40 micron cloths). The $K_2O$ eq. concentration from multiple samples from production scale are listed in Table 11.

TABLE 11

Example 9 production sample results.

| Sample # | $K_2O$ eq. Conc. % |
|---|---|
| 1 | 7.7 |
| 2 | 7.7 |
| 3 | 8.7 |
| 4 | 8.1 |
| 5 | 8.2 |
| 6 | 8.7 |
| 7 | 8.5 |
| 8 | 8.0 |

As shown, the results are repeatable at production scale. Dry citric acid which is registered for use in organic agriculture can optionally be used to lower the final product pH. Only a small amount is needed to lower pH from 8 to 7 (0.2% by wt.) while increasing amounts are needed to drop final below 7 due to the pKa of the acids in solution. A neutral pH of 7.0 is desirable for a foliar fertilizer application because acidic (low pH) acetate solutions are known to inhibit plant growth (Allen et al., Biostimulant Potential of Acetic Acid Under Drought Stress Is Confounded by pH-Dependent Root Growth Inhibition, Front. Plant Sci., 25 May 2020, DOI: doi.org/10.3389/fpls.2020.00647; and Lynch et al., Production and phytotoxicity of acetic acid in anaerobic soils containing plant residues, Soil Biology and Biochemistry, Volume 10, Issue 2, 1978, Pages 131-135). If excess acetic acid were added to the sunflower ash, the pH would drop far below neutral resulting in inhibition of plant growth. Yet, adding insufficient levels of acetic acid to sunflower ash would reduce the recoverable potassium yield. Thus, it is only the titrated-to-neutral compositions of this disclosure which are expected to exhibit an increase in crop yields and/or plant growth while maintaining optimal potassium recovery. The inventors recognized that citric acid, a mild acid, is suitable as both a Certified Organic acid, is well-tolerated by plants, and is useful as an acid to titrate the resulting composition to a pH to a range selected from 6.0 to 7.3. In some embodiments, the pH of the Certified or Certifiably Organic potassium acetate/citrate compositions of this disclosure have a pH selected from 6.0, 6.1, 6.2, 6.3, 6.4, 6.5, 6.6, 6.7, 6.8, 6.9, 7.0, 7.1, 7.2, or 7.3, or any pH between any of the aforementioned values.

Table 12 lists for some embodiments the range of titratable pH potassium acetate solutions after titration with citric acid.

TABLE 12

Potassium acetate titration with citric acid.

| Citric acid addition (wt. %) | pH |
|---|---|
| 0.0% | 8.35 |
| 0.2% | 7.02 |
| 0.3% | 6.87 |
| 0.4% | 6.70 |
| 0.5% | 6.62 |
| 0.6% | 6.52 |
| 0.7% | 6.47 |
| 0.8% | 6.41 |
| 0.9% | 6.36 |
| 1.0% | 6.31 |

Example 10. Foliar Administration of Potassium Acetate Compositions to Strawberries The potassium acetate solution, having a pH of 7.2, made by the method of Example 2 was used as a foliar fertilizer to strawberry plants.

To three cohorts of strawberries (Portola var.) grown in a controlled nursery environment were separately applied (a) a solution of grower's standard alone, (b) a low dose of potassium acetate fertilizer (1 quart per acre), and (c) a high dose of potassium acetate fertilizer (2 quarts per acre), with all fertilizers foliarly administered once per two weeks. The growing temperature during fertilizer application was between 55 degrees Fahrenheit (12 degrees Celsius) and 60 degrees Fahrenheit (15.5 degrees Celsius), with minimal wind condition (below 2 miles per hour (3.2 km/hr)). There were 6 replicates per pick day, with the average represented in the Figures. All treatments received, at planting, controlled release fertilizer and in season only applications of nitrogen, phosphorus and potassium (only on the two test treatments), along with seasonally necessitated foliar pest control. All potassium test materials were applied as foliar applications. No problems with phytotoxicity were noted through the use the test materials.

Figure 2:
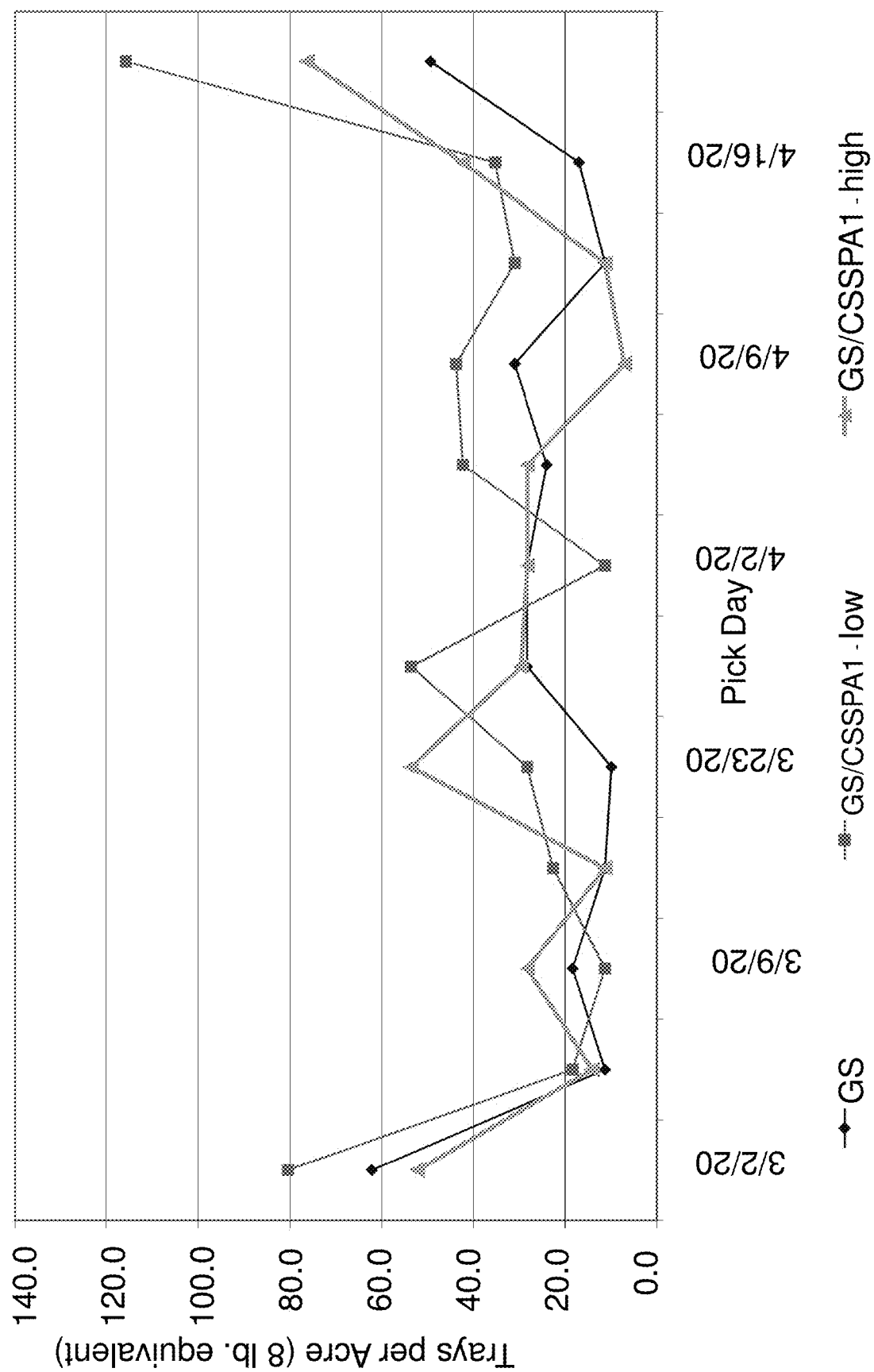
FIG. 2 shows a graph of the crop yield per day for cohorts treated with growers standard ("GS") a composition comprising inorganic $KNO_3$ and $KCl$, a cohort treated with GS then a potassium acetate fertilizer composition of Example 1 at a low administration rate (1 quart per acre, mixed with 50 gallons of water per acre) ("GS/CSSPA1-low"), and a cohort treated with GS then a potassium acetate fertilizer composition of Example 1 at a high administration rate (2 quarts per acre, mixed with 50 gallons of water per acre) ("GS/CSSPA1-high"). The potassium acetate fertilizer when administered at a low administration rate yielded a consistently higher crop yield than the grower's standard alone.
Figure 3:
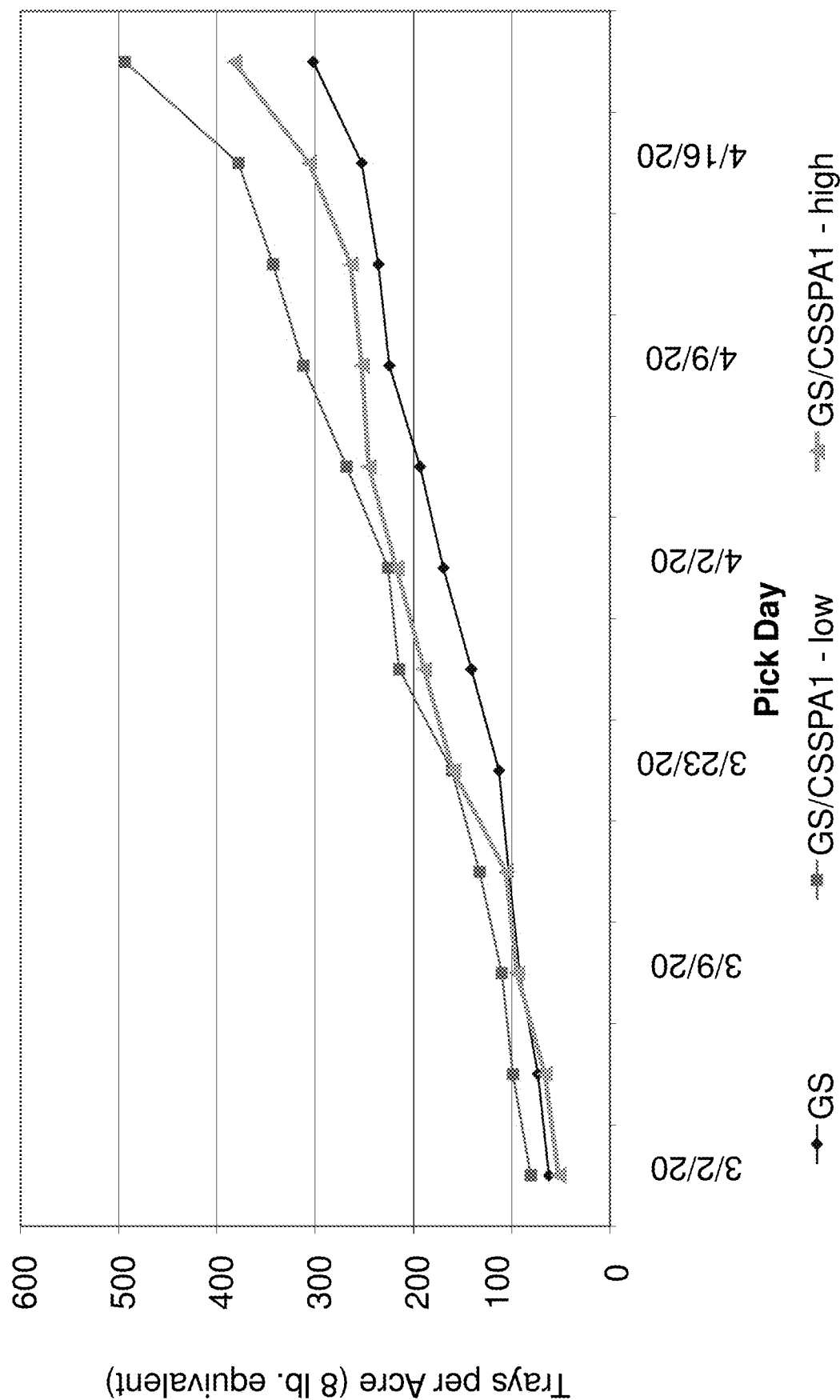
FIG. 3 shows a graph of the cumulative marketable crop yield over the course of a partial growing season (Mar. 2, 2020 through Apr. 16, 2020) for cohorts treated with growers standard ("GS") a composition comprising inorganic $KNO_3$ and $KCl$, a cohort treated with GS then a potassium acetate fertilizer composition of Example 1 at a low administration rate (1 quart per acre, mixed with 50 gallons of water per acre) ("GS/CSSPA1-low"), and a cohort treated with GS then a potassium acetate fertilizer composition of Example 1 at a high administration rate (2 quarts per acre, mixed with 50 gallons of water per acre) ("GS/CSSPA1-high"). The potassium acetate fertilizer when administered at a low administration rate yielded a cumulatively higher crop yield than the grower's standard alone over the course of the partial growing season.
Figure 4:
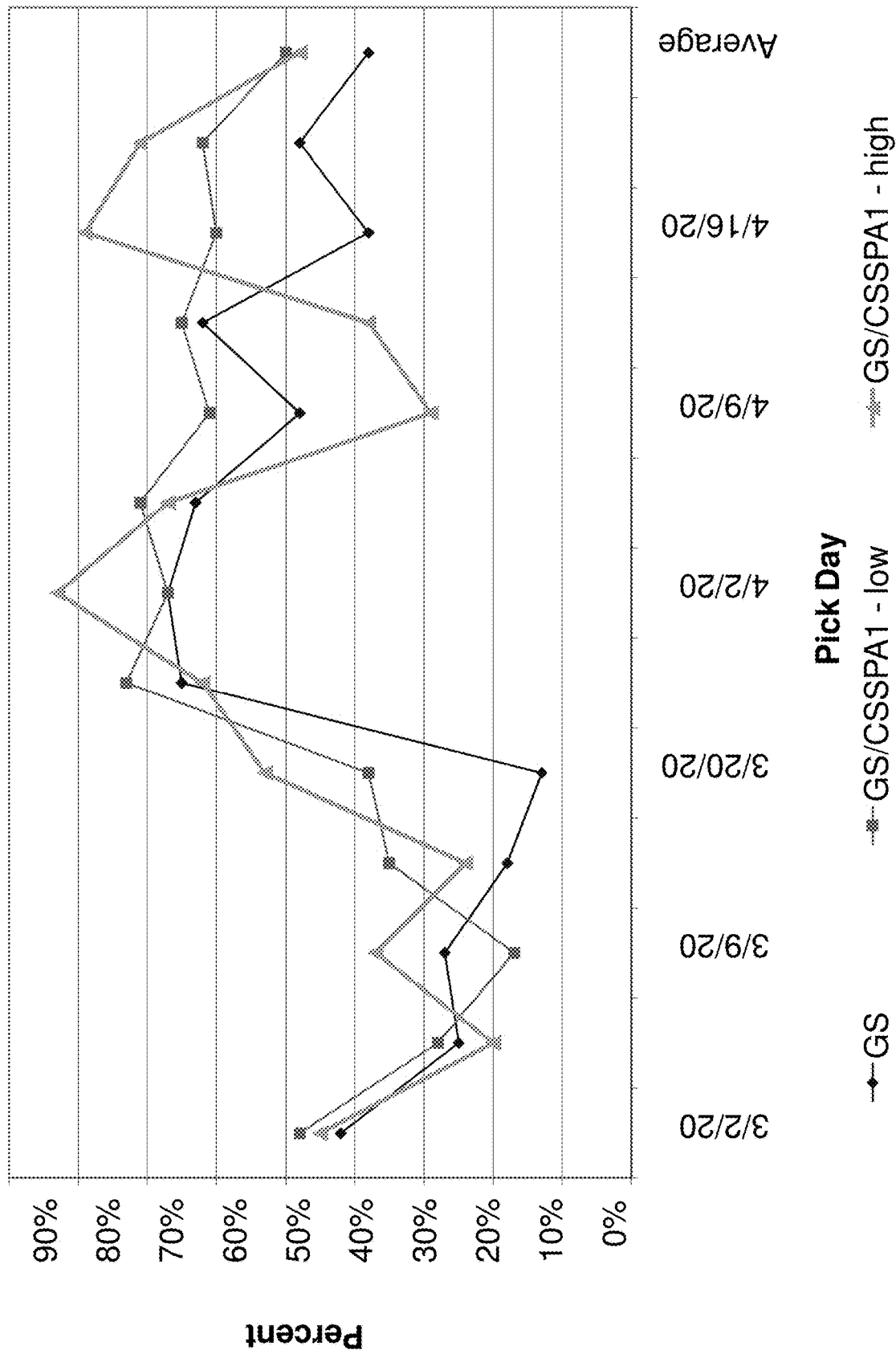
FIG. 4 shows a graph of the marketable utilization of picked fruit by pick day. This represents only the yield of the marketable fruits after culling. Both cohorts treated with the potassium acetate fertilizer exhibited a higher average marketable utilization compared to the grower's standard alone.
Figure 5:
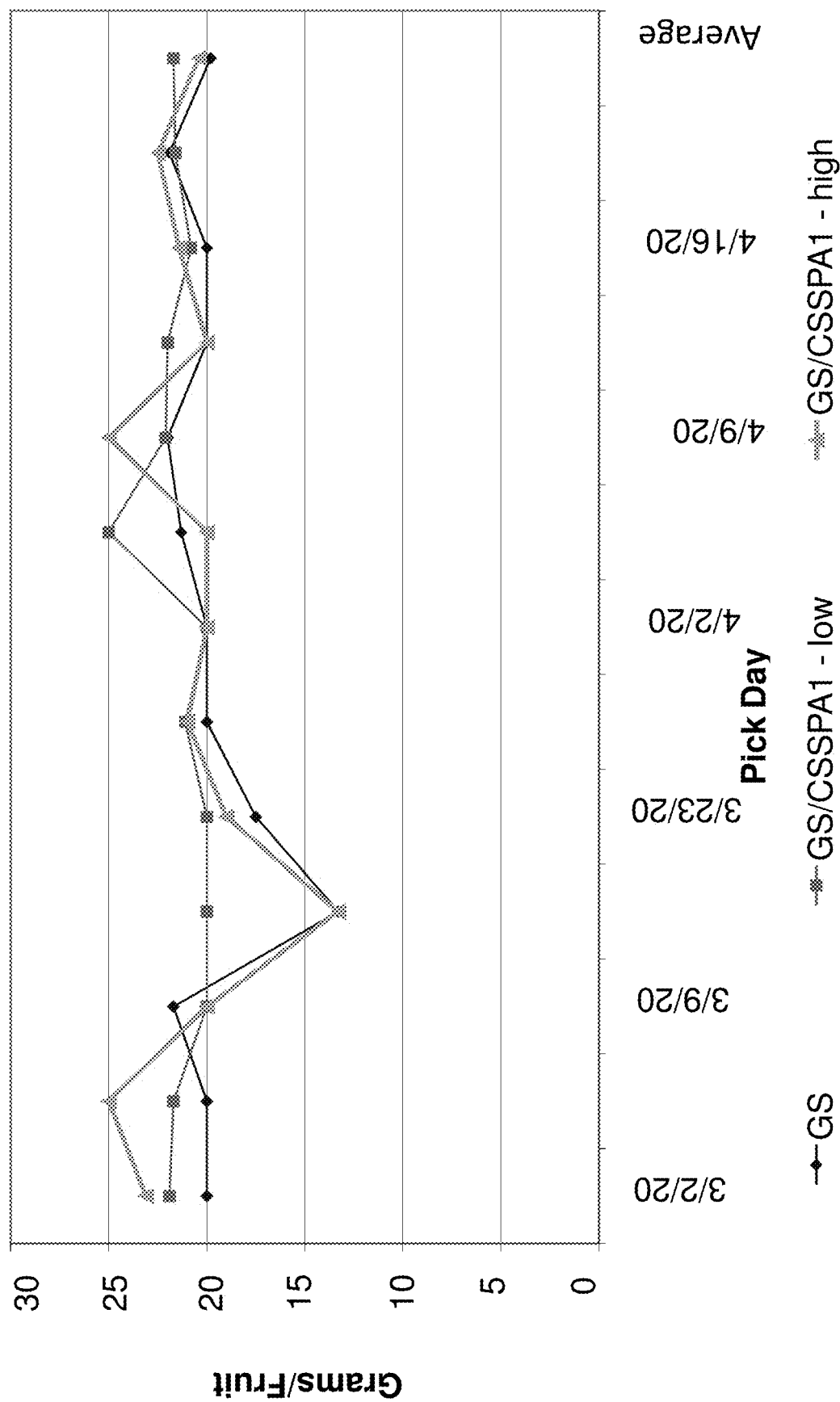
FIG. 5 shows the mean weight per marketable (post-culling) fruit over the course of the partial growing season. The potassium acetate fertilizer when administered at a low administration rate yielded a higher average mean weight per fruit than the grower's standard alone over the course of the partial growing season.

The cohort treated with a low dose of potassium acetate fertilizer produced statistically more flats of strawberries during the trial period over the grower's standard on a per-day bases (FIG. 2), and cumulatively over the season (FIG. 3). FIG. 4 shows the daily market utilization for the berries picked during the season that is the percent of marketable berries to the total weight of berries picked, with both potassium acetate fertilizer treatments showing a 50 and 48% utilization on average, and the grower standard at 38%. FIG. 5 shows the mean weight per marketable fruit during the season. Both potassium acetate fertilizer treatment rates showed observable weight increases on average over the grower standard fertilizer. The enhanced growth rate of potassium acetate fertilizer over grower standard is surprising given that acetic acid is known to inhibit plant growth when added to soil of growing plants. Thus, only by identification of a carefully adjusted potassium acetate formulation resulted in the observed plant and/or crop yield increase.

Sugar content in each of the cohorts was measured at three timepoints throughout the season by BRIX value, with the data presented in Table 13. While not statistically significant, the sugar content (as measured by BRIX) for each of the potassium acetate-treated cohorts was higher than the cohort treated with grower's standard alone, suggesting that the potassium acetate fertilizer compositions of this disclosure can increase the sugar content of a crop over cohorts treated with inorganic potassium salts alone.

TABLE 13

BRIX data (which measures sugar content) collected for the three tested cohorts for potassium fertilizer comparison experiment.

| GS | Potassium Acetate - low dose | Potassium Acetate - high dose | Replicate |
|---|---|---|---|
| 5.3 | 5.6 | 5.7 | 1 |
| 5.7 | 5.9 | 5.7 | 2 |
| 5.8 | 5.8 | 5.3 | 3 |
| 5.4 | 5.7 | 5.8 | 4 |
| 5.5 | 5.7 | 5.8 | 5 |
| 5.5 | 5.5 | 5.7 | 6 |
| 5.5 | 5.7 | 5.7 | Average |

Leaves from each treatment cohort were analyzed for their nutrient content, including potassium levels, during the course of the season. It was found that while very similar levels of nitrogen and phosphorous were observed in all treatment cohorts, leaf potassium levels (wt. %) of both potassium acetate fertilizer treated cohorts were significantly less than the potassium level in the grower's standard treated cohort, as shown in Table 14. This is consistent with the observed crop yield increase for these potassium acetate-treated cohorts over the GS cohort because it is known that fruit is a potassium sink (100 g of strawberries comprises about 153 mg of potassium, but only about 24 mg of phosphorous). In strawberries, it is known that 3.7 pounds ($K_2O$ equivalent) are removed for every ton of fruit harvested (or, 93 tons of potassium are typically removed for a 5000 flat yield). Thus, the potassium acetate compositions of this disclosure, when applied as a foliar fertilizer, yield higher fruit yield compared to inorganic potassium fertilizer alone (e.g., Grower's Standard, GS).

TABLE 14

Average nutrient levels in leaves of harvested strawberry plants for each of the cohort treatments. All units are in wt. %.

| Nutrient | GS | Potassium Acetate - low dose | Potassium Acetate - high dose |
|---|---|---|---|
| N | 3.13 | 2.88 | 2.91 |
| P | 0.49 | 0.42 | 0.46 |
| K | 1.60 | 1.39 | 1.45 |

In summary, while the mean weight of the harvested fruit was not significantly higher for a cohort treated with potassium acetate fertilizer composition of this disclosure, the total number of fruit (crop yield) was higher, and matched the lower potassium levels in the plants, consistent with the observation that the form of potassium acetate fertilizer compositions of this disclosure can increase fruit yield relative to cohorts treated with inorganic potassium (e.g., KCl, $KNO_3$) alone.

The inventions described and claimed herein have many attributes and embodiments including, but not limited to, those set forth or described or referenced in this Detailed Disclosure. It is not intended to be all-inclusive and the inventions described and claimed herein are not limited to or by the features or embodiments identified in this Detailed Disclosure, which is included for purposes of illustration only and not restriction. A person having ordinary skill in the art will readily recognize that many of the components and parameters may be varied or modified to a certain extent or substituted for known equivalents without departing from the scope of the invention. It should be appreciated that such modifications and equivalents are herein incorporated as if individually set forth. The invention also includes all of the steps, features, compositions and compounds referred to or indicated in this specification, individually or collectively, and any and all combinations of any two or more of said steps or features.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents. Reference to any applications, patents and publications in this specification is not, and should not be taken as, an acknowledgment or any form of suggestion that they constitute valid prior art or form part of the common general knowledge in any country in the world.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of this, any of the terms "comprising", "consisting essentially of", and "consisting of" may be replaced with either of the other two terms in the specification. The term "essentially" as used herein means about the undisturbed state, accounting for minor variations due to exposure to atmospheric conditions. Also, the terms "comprising", "including", containing", etc. are to be read expansively and without limitation. The methods and processes illustratively described herein suitably may be practiced in differing orders of steps, and that they are not necessarily restricted to the orders of steps indicated herein or in the claims. It is also that as used herein and in the appended claims, the singular forms "a," "an," and "the" include plural reference unless the context clearly dictates otherwise. Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants. Furthermore, titles, headings, or the like are provided to enhance the reader's comprehension of this document, and should not be read as limiting the scope of this. Any examples of aspects, embodiments or components of the invention referred to herein are to be considered non-limiting.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although this has been specifically disclosed by preferred embodiments and optional features, modification and variation of the concepts herein disclosed may be resorted to by those skilled in the art, and that such modifications and variations are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims. In addition, where features or aspects of the invention are described in terms of Markush groups, those skilled in the art will recognize that the invention is also thereby described in terms of any individual member or subgroup of members of the Markush group.

What is claimed is:

1. A potassium fertilizer composition made by a process comprising mixing acetic acid and sunflower hull ash, under heat and agitation, for a time between 30 minutes and 96 hours, at a temperature between ambient temperature and 60 degrees Celsius, and titrating the resulting solution with citric acid to a pH between 6.0 and 7.3.

2. The composition of claim 1, wherein the temperature is between ambient temperature and 50 degrees Celsius.

3. The composition of claim 1, wherein the mixing occurs for 30 minutes to 24 hours.

4. The composition of claim 1, further comprising a micronutrient selected from: Ca, Mg, Mn, Mo, S, or combinations thereof.

5. A method of producing a water-soluble Certified Organic potassium $C_{1-4}$ monocarboxylate fertilizer solution by: (a) dissolving a Certified Organic $C_{1-4}$ monocarboxylic acid in water, and (b) adding sunflower hull ash, and (c) increasing the temperature to a selected temperature, (d) removing the solids by one or a plurality of filtration steps, (e) titrating the pH of the solution to a range between 6.0 and 7.3 with citric acid, and (f) obtaining Organic Certification of the resulting potassium $C_{1-4}$ monocarboxylate solution, to form a water-soluble Certified Organic potassium $C_{1-4}$ monocarboxylate fertilizer solution.

6. The method of claim 5, wherein the potassium $C_{1-4}$ monocarboxylate solution is heated for 1-3 hours at a temperature between ambient and 50 degrees Celsius before the filtering step.

7. The method of claim 5 further comprising a step of adjusting the pH of the potassium $C_{1-4}$ monocarboxylate solution to 6-7 by the titrated addition of citric acid.

8. The method of claim 5, wherein the water-soluble Certified Organic potassium $C_{1-4}$ monocarboxylate is substantially soluble in the solution.

9. The method of claim 5, wherein the filtered water-soluble potassium $C_{1-4}$ monocarboxylate solution has a turbidity of less than 50 NTU.

10. The method of claim 5, wherein the sunflower hull ash is at about 25 wt. % or less, the water is at about 25 wt. % or less, and the acid is at about 25 wt. % of the total solution mass, wherein the acid is at a concentration of about 30 wt. %.

11. A foliar potassium fertilizer certifiable for use in organic crop production comprising the potassium fertilizer made by the method of claim 5.

12. A method of increasing fruit yield, the method comprising presenting by foliar application to plants capable of bearing fruit the composition made by the method of claim 5.

* * * * *